United States Patent
Botros

(10) Patent No.: US 9,499,723 B2
(45) Date of Patent: Nov. 22, 2016

(54) POLYOLEFIN-BASED COMPOSITIONS, ADHESIVES, AND RELATED MULTI-LAYERED STRUCTURES PREPARED THEREFROM

(71) Applicant: Equistar Chemicals, LP, Houston, TX (US)

(72) Inventor: Maged G. Botros, Liberty Township, OH (US)

(73) Assignee: Equistar Chemicals, LP, Houston, TX (US)

(*) Notice: Subject to any disclaimer, the term of this patent is extended or adjusted under 35 U.S.C. 154(b) by 544 days.

(21) Appl. No.: 14/164,979

(22) Filed: Jan. 27, 2014

(65) Prior Publication Data
US 2015/0210902 A1    Jul. 30, 2015

(51) Int. Cl.
| | | |
|---|---|---|
| B32B 27/08 | (2006.01) | |
| B32B 27/34 | (2006.01) | |
| B32B 27/30 | (2006.01) | |
| B32B 27/32 | (2006.01) | |
| C09J 123/04 | (2006.01) | |
| C09J 151/06 | (2006.01) | |
| C09J 123/16 | (2006.01) | |
| C08L 51/06 | (2006.01) | |
| C09J 123/08 | (2006.01) | |

(52) U.S. Cl.
CPC ...... *C09J 123/0815* (2013.01); *C08L 2203/16* (2013.01); *Y10T 428/2878* (2015.01)

(58) Field of Classification Search
CPC ....... B32B 27/08; B32B 27/34; B32B 27/30; B32B 27/32; C09J 123/04; C09J 151/06; C09J 123/16; C08L 51/06
See application file for complete search history.

(56) References Cited

U.S. PATENT DOCUMENTS

| | | | | |
|---|---|---|---|---|
| 5,045,401 A | * | 9/1991 | Tabor | B32B 7/12 428/516 |
| 7,687,575 B2 | * | 3/2010 | Lee | B32B 27/32 428/461 |
| 2010/0174036 A1 | * | 7/2010 | Lee | B32B 7/12 525/74 |
| 2013/0052471 A1 | * | 2/2013 | Botros | B32B 27/32 428/476.9 |

FOREIGN PATENT DOCUMENTS

| | | |
|---|---|---|
| WO | WO-2004082936 A1 | 9/2004 |
| WO | WO-2006019922 A1 | 2/2006 |
| WO | WO-2012044768 A1 | 4/2012 |
| WO | WO-2013032926 A1 | 3/2013 |

OTHER PUBLICATIONS

PCT International Search Report and the Written Opinion—Mailed May 29, 2015 (May 29, 2015) for Corresponding PCT/US2015/012991.

* cited by examiner

*Primary Examiner* — Charles Boyer

(57) ABSTRACT

The present disclosure provides a polyolefin-based composition suitable for use as adhesives and/or tie-layer adhesive compositions as well as multi-layered structures made from and/or containing the polyolefin-based composition. The polyolefin-based composition is made from and/or contains (a) a grafted polyolefin composition, (b) a linear low density polyethylene composition made from and/or containing metallocene-catalyzed linear low density polyethylene having a melt index from about 2 to about 10 grams per 10 minutes, (c) an elastomer composition made from and/or containing an polyethylene elastomer, (d) a hydrocarbon-based tackifier, and (e) optionally, an additives composition having one or more additives.

18 Claims, No Drawings

POLYOLEFIN-BASED COMPOSITIONS, ADHESIVES, AND RELATED MULTI-LAYERED STRUCTURES PREPARED THEREFROM

FIELD OF THE INVENTION

The present disclosure relates to polyolefin-based compositions useful as adhesives and/or tie-layer adhesive compositions for multi-layered structures. In particular, the compositions are useful as adhesives to bind a polyester-based layer to a dissimilar substrate.

DESCRIPTION OF RELATED ART

Tie-layer adhesives are used to bond polyesters to dissimilar substrates in multi-layer, co-extruded structures, beverage and food containers (e.g., bags, shrink bags, pouches, casings, trays, lidded trays, overwrapped trays, form shrink packages, vacuum skin packages, flow wrap packages, thermoformed packages, packaging inserts or combinations thereof), medicine and makeup containers, shipping packaging, electronic components, synthetic fibers, fiberfill applications (e.g., home insulation, cushions, and pillows), and metal laminate applications (e.g., building and construction products, business and consumer products, containers and packaging products, electrical equipment, machinery and industrial equipment, signs and displays, and transportation products). They can be used in lamination, extrusion (or coextrusion), sheet extrusion, extrusion coating, injection molding, blow molding, melt thermoforming, and other processes.

Improved tie-layer adhesive compositions suitable for use in making multi-layer structures with good adhesion and high clarity are needed. A valuable approach would avoid expensive additives and performance tradeoffs. Ideally, improved tie-layer adhesives could be made using economical starting materials, commonly used equipment, and familiar techniques.

SUMMARY OF THE INVENTION

In some embodiments, the present disclosure is directed to a polyolefin-based composition made from and/or containing (a) a grafted polyolefin composition, (b) a linear low density polyethylene composition made from and/or containing a first metallocene-catalyzed linear low density polyethylene having a melt index from about 2 to about 10 grams per 10 minutes, (c) an elastomer composition made from and/or containing an polyethylene elastomer, (d) a hydrocarbon-based tackifier, and (e) optionally, an additives composition having one or more additives. The polymeric composition is suitable for use as a tie-layer adhesive composition.

In further embodiments, the present disclosure is directed to an adhesive made from and/or containing a polyolefin-based composition made from and/or containing (a) from about 1 to about 30 weight percent of a grafted polyolefin composition, relative to the total weight of the polyolefin-based composition, (b) from about 10 to about 80 weight percent of a linear low density polyethylene composition, relative to the total weight of the polyolefin-based composition, (c) from about 10 to about 40 weight percent of an elastomer composition, relative to the total weight of the polyolefin-based composition, (d) from about 1 to about 20 weight percent of a tackifier composition, relative to the total weight of the polyolefin-based composition, and (e) optionally, an additives composition.

In yet additional embodiments, the present disclosure is directed to a multi-layered structure made from and/or containing a tie-layer adhesive made from and/or containing a polyolefin-based composition. The polyolefin-based composition made from and/or containing (a) from about 1 to about 30 weight percent of a grafted polyolefin composition, relative to the total weight of the polyolefin-based composition, (b) from about 10 to about 80 weight percent of a linear low density polyethylene composition, relative to the total weight of the polyolefin-based composition, (c) from about 10 to about 40 weight percent of an elastomer composition, relative to the total weight of the polyolefin-based composition, (d) from about 1 to about 20 weight percent of a tackifier composition, relative to the total weight of the polyolefin-based composition, and (e) optionally, an additives composition.

DETAILED DESCRIPTION

The present invention now will be described more fully hereinafter. However, this invention may be embodied in many different forms and should not be construed as limited to the embodiments set forth herein; rather, these embodiments are provided so that this disclosure will satisfy applicable legal requirements. As such, it will be apparent to those skilled in the art that the embodiments may incorporate changes and modifications without departing from the general scope of this invention. It is intended to include all such modifications and alterations in so far as they come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a convenient means for identifying discrete activities or ingredients and the recited lettering can be arranged in any sequence, unless expressly indicated.

For the purpose of the present description and of the claims which follow, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

Definitions

In the present description, the terms "adhesive layer" and "tie layer" mean a layer or material placed on one or more substrates to promote the adhesion of that substrate to another layer. Preferably, adhesive layers are positioned between two layers of a multilayer structure to maintain the two layers in position relative to each other and prevent undesirable delamination.

In the present description, the term "α-olefin" or "alpha-olefin" means an olefin of formula $CH_2=CH-R$, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the terms "constrained geometry catalyst" and "CGC" have the same meaning as this term is defined and described in U.S. Pat. No. 5,272,236 and U.S. Pat. No. 5,278,272.

In the present description, the terms "constrained geometry catalyst-catalyzed polymer" and "CGC-catalyzed polymer" mean any polymer that is made in the presence of a constrained geometry catalyst.

In the present description, the term "elastomer" refers to polymer compounds having rubber-like properties and crystallinity less than about 10 percent, more preferably less than about 5 percent, and most preferably no crystallinity.

In the present description, the term "grafted polyolefin" refers to a polyolefin grafted with an unsaturated monomer. The unsaturated monomer is typically an unsaturated polar monomer, preferably containing one or more oxygen atoms. Preferred examples of such unsaturated monomers will be given hereinafter.

In the present description, the term "grafted polyolefin composition" refers to a composition made from and/or containing at least one grafted polyolefin.

In the present description, the term "homopolymer" and similar terms mean a polymer consisting solely or essentially all of units derived from a single kind of monomer, e.g., ethylene homopolymer is a polymer comprising solely or essentially all of units derived from ethylene, propylene homopolymer is a polymer comprising solely or essentially all of units derived from propylene, and the like.

In the present description, the term "interpolymer" means a polymer prepared by the polymerization of at least two types of monomers or comonomers. It includes, but is not limited to, copolymers (which usually refers to polymers prepared from two different types of monomers or comonomers, although it is often used interchangeably with "interpolymer" to refer to polymers made from three or more different types of monomers or comonomers), terpolymers (which usually refers to polymers prepared from three different types of monomers or comonomers), tetrapolymers (which usually refers to polymers prepared from four different types of monomers or comonomers), and the like.

In the present description, the term "long-chain" refers to carbon chains that are C6 or longer. "Long chain branching (LCB)" can be determined by conventional techniques known in the industry, such as $^{13}C$ nuclear magnetic resonance ($^{13}C$ NMR) spectroscopy, using, for example, the method of Randall (Rev. Micromole. Chem. Phys., C29 (2&3) 1989, p. 285-297). Two other methods are gel permeation chromatography, coupled with a low angle laser light scattering detector (GPC-LALLS), and gel permeation chromatography, coupled with a differential viscometer detector (GPC-DV). The use of these techniques for long chain branch detection, and the underlying theories, have been well documented in the literature. See, for example, Zimm, B. H. and Stockmayer, W. H., J. Chem. Phys., 17, 1301 (1949) and Rudin, A., Modern Methods of Polymer Characterization, John Wiley & Sons, New York (1991) pp. 103-112.

In the present description, the term "long-chain branched polyolefin" refers to a polyolefin having at least 1 long chain branch per 1000 carbons.

In the present description, the term "metallocene" means a metal-containing compound having at least one substituted or unsubstituted cyclopentadienyl group bound to the metal.

In the present description, the term "metallocene-catalyzed polymer" means any polymer that is made in the presence of a metallocene catalyst.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., $-CH_2-CH_2-$, and not the monomer itself, e.g., $CH_2=CH_2$.

In the present description, "plastic film packaging" is of particular concern and discussed throughout this description. To faciliate that discussion, various polymer acronyms are used herein; they are recited below. When referring to blends of polymers, the description may use a colon (:) to indicate that the components to the left and right of the colon are blended. When referring to a multi-layer structure, the description may use a slash "/" to indicate that components to the left and right of the slash are in different layers and the relative position of components in layers may be so indicated by use of the slash to indicate layer boundaries.

Acronyms commonly employed herein include:
EAA: Copolymer of ethylene with acrylic acid
EAO: Copolymers of ethylene with at least one alpha-olefin
EBA: Copolymer of ethylene with butyl acrylate
EEA: Copolymer of ethylene with ethyl acrylate
EMA: Copolymer of ethylene with methyl acrylate
EMAA: Copolymer of ethylene with methacrylic acid
EVA: Copolymer of ethylene with vinyl acetate
EVOH: Saponified or hydrolyzed copolymer of ethylene and vinyl acetate
PB: Polybutylene-1 (a butylene homopolymer and/or copolymer of a major portion of butylene-1 with one or more alpha-olefins)
PE: Polyethylene (an ethylene homopolymer and/or copolymer of a major portion of ethylene with one or more alpha-olefins)
PP: Polypropylene homopolymer or copolymer
PET: Polyethylene terephthalate
PETG: Glycol-modified polyethylene terephthalate
PLA: Polylactic acid
PVDC: Polyvinylidene chloride (also includes copolymers of vinylidene chloride, especially with vinyl chloride and/or methyl acrylate (MA)).

In the present description, the term "polyester" means an homopolymer or a copolymer having an ester linkage between monomer units. In general, polyesters are synthetic polymers prepared by the polycondensation of one or more difunctional carboxylic acids with one or more difunctional hydroxyl compounds. Typically, the difunctional carboxylic acid is a dicarboxylic acid or a hydroxycarboxylic acid, and the difunctional hydroxyl compound is a dihydric alcohol such as, for example, glycols and diols. The ester can be represented by the general formula:

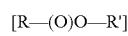
[R—(O)O—R']

where R and R'=alkyl group.

The dicarboxylic acid may be linear or aliphatic, i.e., oxalic acid, maleic acid, succinic acid, glutaric acid, adipic acid, pimelic acid, suberic acid, azelaic acid, sebacic acid, and the like; or may be aromatic or alkyl substituted aromatic, i.e., various isomers of phthalic acid, such as paraphthalic acid (or terephthalic acid), isophthalic acid and naphthalic acid. Specific examples of aliphatic polyesters include, but are not limited to, polylactic acid (PLA) homopolymer and copolymers, and those described in U.S. Pat. No. 7,422,782, which is incorporated herein by reference in its entirety. Exemplary of alkyl substituted aromatic acids include the various isomers of dimethylphthalic acid, such as dimethylisophthalic acid, dimethylorthophthalic acid, dimethylterephthalic acid, the various isomers of diethylphthalic acid, such as diethylisophthalic acid, diethylorthopbthalic acid, the various isomers of dimethylnaphthalic acid, such as 2,6-dimethylnaphthalic acid and 2,5-dimethylnaphthalic acid, and the various isomers of diethylnaphthalic acid.

The difunctional hydroxyl compound may be straight-chained or branched. Specific examples include ethylene glycol, propylene glycol, trimethylene glycol, 1,4-butane diol, neopentyl glycol, an aromatic diol (such as, for example, hydroquinone), and the like.

The term "polyester" further includes homopolyesters and copolyesters.

In the present description, the term "polymer" means a macromolecular compound prepared by polymerizing monomers of the same or different type. The term "polymer" includes homopolymers, copolymers, terpolymers, interpolymers, and so on.

In the present description, the term "polyolefin" is used herein broadly to include polymers such as polyethylene, ethylene-alpha olefin copolymers (EAO), polypropylene, polybutene, and ethylene copolymers having a majority amount by weight of ethylene polymerized with a lesser amount of a comonomer such as vinyl acetate, and other polymeric resins within the "olefin" family classification.

Polyolefins may be made by a variety of processes well known in the art including batch and continuous processes using single, staged or sequential reactors, slurry, solution, and fluidized bed processes and one or more catalysts including for example, heterogeneous and homogeneous systems and Ziegler, Phillips, metallocene, single-site, and constrained geometry catalysts to produce polymers having different combinations of properties. Such polymers may be highly branched or substantially linear and the branching, dispersity, and average molecular weight may vary depending upon the parameters and processes chosen for their manufacture in accordance with the teachings of the polymer arts.

In the present description and with regard to polyethylene, the polymer can be classified as linear low-density polyethylene (LLDPE) having a density from about 0.910 to about 0.925 grams per cubic centimeter, low-density polyethylene (LDPE) also having a density from about 0.910 to about 0.925 grams per cubic centimeter, medium-density polyethylene (MDPE) having a density from about 0.926 to about 0.940 grams per cubic centimeter, and high-density polyethylene (HDPE) having a density from about 0.941 to about 0.970 grams per cubic centimeter.

In the present description, the term "room temperature" refers to a temperature around 25 degrees Celsius.

In the present description, the term "thermoplastic polymer" means a polymer that softens when exposed to heat and returns to its original condition when cooled to room temperature.

In the present description, the terms "Ziegler-Natta-catalyzed polymer" and "Z-N-catalyzed polymer" mean any polymer that is made in the presence of a Ziegler-Natta catalyst.

Testing

ASTM D 1238 is entitled "Test Method for Melt Flow Rates of Thermoplastics by Extrusion Plastometer." The term "ASTM D 1238" as used herein refers to the standard test method for determining melt flow rates of thermoplastics by extrusion plastometer. In general, this test method covers the determination of the rate of extrusion of molten thermoplastic resins using an extrusion plastometer. After a specified preheating time, resin is extruded through a die with a specified length and orifice diameter under prescribed conditions of temperature, load, and piston position in the barrel. This test method was approved on Feb. 1, 2012 and published March 2012, the contents of which are incorporated herein by reference in its entirety. For the referenced ASTM standards, visit the ASTM website, www.astm.org, or contact ASTM Customer Service at service@astm.org.

Throughout the present description and claims, all the standard melt index values are measured according to ASTM D 1238, using a piston load of 2.16 kg and at a temperature of 190 degrees Celsius. The High Load Melt Index (or HLMI) values are also measured according to ASTM D 1238, but using a piston load of 21.6 kg and at a temperature of 190 degrees Celsius.

ASTM D 1876 is entitled "Standard Test Method for Peel Resistance of Adhesives (T-Peel Test)." The term "ASTM D 1876" as used herein refers to a test method for determining the relative peel resistance of adhesive bonds between flexible adherends by means of a T-type specimen. The accuracy of the results of strength tests of adhesive bonds will depend on the conditions under which the bonding process is carried out. This test method was approved on Oct. 10, 2001 and published December 2001, the contents of which are incorporated herein by reference in its entirety. For the referenced ASTM standards, visit the ASTM website, www.astm.org, or contact ASTM Customer Service at service@astm.org.

The force required to separate the multi-layer structure apart in a T-peel configuration at 25.4 cm (10 inches)/min is measured using an INSTRON™ tensile tester. The average adhesion of five specimens is recorded as the peel strength in kg/cm (lb/in).

Incorporated Unsaturated Monomer (Weight Percent): The amount of the unsaturated monomer incorporated into the grafted polyolefin can be measured by wet chemical methods (titration, etc.) or more preferably, by Fourier transform infrared spectroscopy (FTIR), according to methods that are well known in the art.

In a general embodiment, the present disclosure provides a polyolefin-based composition made from and/or containing (a) a grafted polyolefin composition, (b) a linear low density polyethylene composition, (c) an elastomer composition, (d) a tackifier composition, and (e) optionally, an additives composition having one or more additives.

In a general embodiment, the present disclosure provides a polyolefin-based composition made from and/or containing:

(a) from about 1 to about 30 weight percent of a grafted polyolefin composition, relative to the total weight of the polyolefin-based composition;

(b) from about 10 to about 80 weight percent of a linear low density polyethylene composition, relative to the total weight of the polyolefin-based composition;

(c) from about 10 to about 40 weight percent of an elastomer composition, relative to the total weight of the polyolefin-based composition;

(d) from about 1 to about 20 weight percent of a tackifier composition, relative to the total weight of the polyolefin-based composition; and (e) optionally, from about 0.01 to about 5 weight percent of an additives composition, relative to the total weight of the polyolefin-based composition.

In a general embodiment, the present disclosure provides a polyolefin-based composition made from and/or containing:

(a) from about 1 to about 30 weight percent of a grafted polyolefin composition, relative to the total weight of the polyolefin-based composition;

(b) from about 10 to about 80 weight percent of a linear low density polyethylene composition, relative to the total weight of the polyolefin-based composition, made from and/or containing:

(i) from about 10 to about 100 weight percent of a first metallocene-catalyzed linear low density polyethylene having a melt index from about 2 to about 10 grams per 10 minutes, a density from about 0.910 to about 0.925 grams per cubic centimeter, and a polydispersity index from about 2 to about 4, relative to the total weight of the linear low density polyethylene composition, (ii) from about 0 to about 50 weight percent of a second metallocene-catalyzed linear low density polyethylene having a melt index from about 0.5 to about 2 grams per 10 minutes, a density from about 0.910 to about 0.925 grams per cubic centimeter, and a polydispersity index from about 2 to about 4, relative to the total weight of the linear low density polyethylene composition, and (iii) from about 0 to about 50 weight percent of a third linear low density polyethylene having a melt index from about 5 to about 10 grams per 10 minutes and a density from about 0.910 to about 0.925 grams per cubic centimeter, relative to the total weight of the linear low density polyethylene composition;

(c) from about 10 to about 40 weight percent of an elastomer composition, relative to the total weight of the polyolefin-based composition;

(d) from about 1 to about 20 weight percent of a tackifier composition, relative to the total weight of the polyolefin-based composition; and (e) optionally, from about 0.01 to about 5 weight percent of an additives composition, relative to the total weight of the polyolefin-based composition.

In a general embodiment, the present disclosure provides a polyolefin-based composition made from and/or containing:

(a) from about 1 to about 30 weight percent of a grafted polyolefin composition, relative to the total weight of the polyolefin-based composition;

(b) from about 10 to about 80 weight percent of a linear low density polyethylene composition, relative to the total weight of the polyolefin-based composition, made from and/or containing:

(i) from about 10 to about 100 weight percent of a first metallocene-catalyzed linear low density polyethylene having a melt index from about 2 to about 10 grams per 10 minutes, a density from about 0.910 to about 0.925 grams per cubic centimeter, and a polydispersity index from about 2 to about 4, relative to the total weight of the linear low density polyethylene composition, (ii) from about 0 to about 50 weight percent of a second metallocene-catalyzed linear low density polyethylene having a melt index from about 0.5 to about 2 grams per 10 minutes, a density from about 0.910 to about 0.925 grams per cubic centimeter, and a polydispersity index from about 2 to about 4, relative to the total weight of the linear low density polyethylene composition, and (iii) from about 0 to about 50 weight percent of a long-chain branched polyolefin having a melt index from about 0.1 to about 25.0 grams per 10 minutes, relative to the total weight of the linear low density polyethylene composition;

(c) from about 10 to about 40 weight percent of an elastomer composition, relative to the total weight of the polyolefin-based composition;

(d) from about 1 to about 20 weight percent of a tackifier composition, relative to the total weight of the polyolefin-based composition; and (e) optionally, from about 0.01 to about 5 weight percent of an additives composition, relative to the total weight of the polyolefin-based composition.

Preferably, the grafted polyolefin composition is present in an amount from about 1 to about 30 weight percent, relative to the total weight of the polyolefin-based composition. More preferably, the grafted polyolefin composition is present in an amount from about 10 to about 20 weight percent. In some embodiments, the grafted polyolefin is present in 10, 11, 12, 13, 14, 15, 16, 17, 18, 19, or 20 weight percent, relative to the total weight of the polyolefin-based composition.

Grafted polyolefins suitable for use in making the grafted polyolefin composition are prepared by reacting polyolefins with unsaturated monomers at elevated temperatures, with or without a free-radical initiator, under conditions effective to graft unsaturated monomer units onto the polyolefin backbone. Preferably, the grafting reaction occurs under an inert gas, such as nitrogen.

Polyolefins suitable for making the grafted polyolefins include high density polyethylenes (HDPE), medium density polyethylenes (MDPE), low density polyethylenes (LDPE), linear low density polyethylenes (LLDPE), polypropylenes, ethylene-propylene copolymers, impact-modified polypropylenes, and the like, and blends thereof. Preferred polyolefins for making the grafted polyolefin are polyethylenes, more preferably, HDPE and LLDPE, and even more preferably, HDPE. Typically, the even more preferred HDPE has a density from about 0.941 to about 0.970 grams per cubic centimeter.

Suitable unsaturated monomers are also well known. Preferred unsaturated monomers are ethylenically unsaturated carboxylic acids and acid derivatives, particularly esters, anhydrides, acid salts, and the like. Examples include acrylic acid, methacrylic acid, maleic acid, fumaric acid, itaconic acid, citraconic acid, maleic anhydride, tetrahydrophthalic anhydride, norborn-5-ene-2,3-dicarboxylic acid anhydride, nadic anhydride, himic anhydride, and the like, and mixtures thereof. Maleic anhydride is particularly preferred. Other suitable unsaturated monomers are described in U.S. Pat. No. 6,385,777 and U.S. Patent Application Publication No. 2007/0054142, the teachings of which are incorporated herein by reference.

The relative amounts of polyolefin and unsaturated monomer used will vary and depend on factors such as the nature of the polyolefin and the unsaturated monomer, the desired tie-layer properties, the reaction conditions, the available equipment, and other factors. Usually, the unsaturated monomer is used in an amount within the range of about 0.1 to about 15 weight percent, based on the total weight of the grafted polyolefin, preferably from about 0.5 to about 6 weight percent, and most preferably from about 1 to about 3 weight percent.

Grafting of the unsaturated monomer(s) to the polyolefin is accomplished according to known procedures, generally by heating a mixture of the unsaturated monomer(s) and the polyolefin. Most typically, the grafted polyolefin is prepared by melt blending the polyolefin with the unsaturated monomer in a shear-imparting extruder/reactor. Twin screw extruders such as those marketed by Coperion under the designations ZSK-53, ZSK-83, ZSK-90 and ZSK-92 are especially useful for performing the grafting step. A free-radical initiator such as an organic peroxide can be employed but is not necessary.

Grafting of the unsaturated monomer to the polyolefin is performed at elevated temperatures, preferably within the range of 180 degrees Celsius to 400 degrees Celsius, more preferably from 200 degrees Celsius to 375 degrees Celsius, and most preferably from 230 degrees Celsius to 350 degrees Celsius. Shear rates in the extruder can vary over a wide range, preferably from 30 to 1000 rpm, more preferably from 100 to 600 rpm, and most preferably from 200 to 400 rpm.

Preferably, the linear low density polyethylene composition is present in an amount from about 10 to about 80 weight percent, relative to the total weight of the polyolefin-based composition. More preferably, the linear low density polyethylene composition is present in an amount from about 40 to about 60 weight percent. In some embodiments, the linear low density polyethylene composition is present in an amount from about 50 to about 60 weight percent, relative to the total weight of the polyolefin-based composition.

The linear low density polyethylene composition for use in the present invention is made from and/or contains a first metallocene-catalyzed linear low density polyethylene having a melt index from about 2 to about 10 grams per 10 minutes, preferably, from about 2.5 to about 9, more preferably, from about 3.5 to about 8. Preferably, it has a density from about 0.910 to about 0.925 grams per cubic centimeter, more preferably, from about 0.910 to about 0.920. Also, preferably, the first metallocene-catalyzed linear low density polyethylene has a polydispersity index from about 2 to about 4, more preferably, from about 2.5 to about 3.

Preferably, the first metallocene-catalyzed linear low density polyethylene is present in an amount from about 10 to about 100 weight percent, relative to the total weight of the linear low density polyethylene composition. In some embodiments, the first metallocene-catalyzed linear low density polyethylene is present in an amount from about 30 to about 60 weight percent, relative to the total weight of the linear low density polyethylene composition.

Preferably, the linear low density polyethylene composition is further made from and/or contains a second metallocene-catalyzed linear low density polyethylene. More preferably, the second metallocene-catalyzed linear low density polyethylene has a melt index from about 0.5 to about 2 grams per 10 minutes. Even more preferably, it has a density from about 0.910 to about 0.925 grams per cubic centimeter, and yet more preferably, from about 0.910 to about 0.920. Also, even more preferably, the second metallocene-catalyzed linear low density polyethylene has a polydispersity index from about 2 to about 4, and yet more preferably, from about 2.5 to about 3.

Preferably, the second metallocene-catalyzed linear low density polyethylene is present in an amount from about 0 to about 50 weight percent, relative to the total weight of the linear low density polyethylene composition. In some embodiments, the second metallocene-catalyzed linear low density polyethylene is present in an amount from about 20 to about 50 weight percent, relative to the total weight of the linear low density polyethylene composition.

Preferably, the linear low density polyethylene composition is further made from and/or contains a third linear low density polyethylene having a melt index from about 5 to about 10 grams per 10 minutes. Even more preferably, it has a density from about 0.910 to about 0.925 grams per cubic centimeter, and yet more preferably, from about 0.910 to about 0.920.

The third LLDPE is preferably a copolymer of ethylene and 1-butene, 1-hexene, or 1-octene. More preferably, the third LLDPE is hexene-based and even more preferably, having hexane extractables at room temperature from about 18 to about 20 weight percent.

Preferably, the third linear low density polyethylene is present in an amount from about 0 to about 50 weight percent, relative to the total weight of the linear low density polyethylene composition. In some embodiments, the third linear low density polyethylene is present in an amount from about 20 to about 40 weight percent, relative to the total weight of the linear low density polyethylene composition.

Suitable long-chain branched polyolefins include polyethylenes having long-chain branching. Preferably, the long-chain branched polyolefin is a low density polyethylene (LDPE). The LDPE can be an ethylene homopolymer or ethylene copolymerized with one or more monomers, such as vinyl acetate, methyl acrylate, acrylic acid, ethyl acrylate, or a $C_3$ to $C_{10}$ α-olefin.

The LDPE can have a density from about 0.910 to about 0.925 grams per cubic centimeter, and preferably from about 0.915 to about 0.920 grams per cubic centimeter. The LDPE can have a melt index, measured according to ASTM D 1238 at a load of 2.16 kg and a temperature of 190 degrees Celsius, ranging from about 0.10 to about 25.0 grams per 10 minutes, preferably from about 0.1 to about 10.0 grams per 10 minutes, more preferably, from about 0.1 to about 1.0 grams per 10 minutes.

The LDPE is preferably prepared by free radical, high pressure polymerization, in particular by using a tubular or autoclave high pressure polymerization process in the presence of a free radical initiator.

In the preferred embodiment, the LDPE is preferably ethylene homopolymer with a density of about 0.918 grams per cubic centimter and a melt index of about 0.25 grams per 10 minutes. Suitable LDPE polymers include the PETROTHENE™ series LDPE resins such as PETROTHENE™ NA940, which are products of Equistar Chemicals, LP.

Preferably, the long-chain branched polyolefin is present in an amount from about 0 to about 50 weight percent, relative to the total weight of the linear low density polyethylene composition. In some embodiments, the long-chain branched polyolefin is present in an amount from about 5 to about 20 weight percent, relative to the total weight of the linear low density polyethylene composition.

Preferably, the elastomer composition is present in an amount from about 10 to about 40 weight percent, relative to the total weight of the polyolefin-based composition.

More preferably, the elastomer composition is present in an amount from about 20 to about 35 weight percent.

The elastomer composition is made from and/or contains a polyethylene elastomer. Examples of suitable polyethylene elastomers include ethylene/alpha-olefin copolymers with at least one $C_3$ to $C_{10}$ alpha-olefin comonomer, and optionally, a polyene comonomer. The alpha-olefin can also contain a cyclic structure such as cyclohexane or cyclopentane, resulting in an alpha-olefin such as 3-cyclohexyl-1-propene (allylcyclohexane) and vinyl-cyclohexane. Preferably, the polyethylene elastomer is an ethylene/alpha-olefin copolymers with (a) ethylene-derived units and (b) alpha-olefin comonomer units derived from at least one comonomer selected from the group consisting of $C_3$ to $C_{10}$ alpha-olefins. More preferably, the polyethylene copolymer is an ethylene/octene copolymer. Most preferably, the ethylene/octene copolymer has a melt index from about 0.2 to about 6.0 grams per 10 minutes and a density from about 0.850 to about 0.900 grams per cubic centimeter.

Exemplary elastomeric ethylene copolymers include, but are not limited to, ethylene/propylene, ethylene/butene, ethylene/1-octene, ethylene/5-ethylidene-2-norbornene, ethylene/5-vinyl-2-norbornene, ethylene/-1,7-octadiene, ethylene/7-methyl-1,6-octadiene, ethylene/styrene, and ethylene/1,3,5-hexatriene. Exemplary elastomeric ethylene terpolymers include ethylene/propylene/1-octene, ethylene/butene/1-octene, ethylene/propylene/5-ethylidene-2-norbornene, ethylene/butene/5-ethylidene-2-norbornene, ethylene/butene/styrene, ethylene/1-octene/5-ethylidene-2-norbornene, ethylene/propylene/1,3-pentadiene, ethylene/propylene/7-methyl-1,6-octadiene, ethylene/butene/7-methyl-1,6-octadiene, ethylene/1-octene/1,3-pentadiene, and ethylene/propylene/1,3,5-hexatriene. Exemplary elastomeric ethylene tetrapolymers include ethylene/propylene/1-octene/diene, ethylene/butene/1-octene/diene, and ethylene/propylene/mixed dienes.

Such elastomeric ethylene copolymers are commercially available as ENGAGE™ (The Dow Chemical Company), EXACT™ (ExxonMobil Chemical Company), or TAFMER™ (Mitsui Chemical) polymers.

Preferably, the elastomer composition can be further made from and/or contains an ethylene-propylene elastomer in addition to the polyethylene elastomer. Suitable ethylene-propylene elastomers include ethylene-propylene rubber (EPR), ethylene-propylene-diene monomer rubber (EPDM), the like, and mixtures thereof. More preferably, the ethylene-propylene elastomers contain from about 10 to about 80 weight percent of ethylene recurring units, based upon the total weight of the olefin elastomer. Even more preferably, the ethylene-propylene elastomers contain from about 10 to about 70 weight percent of ethylene units. Most preferably, the ethylene-propylene elastomer is an ethylene-propylene rubber (EPR) having (a) a melt index from about 0.2 to about 5.0 grams per 10 minutes and (b) a total content of ethylene-derived units in an amount from about 55 to about 85 weight percent, based upon the total weight of the ethylene propylene rubber.

Commercially available ethylene-propylene elastomers include Lanxess Corporation's BUNA™ EP T2070 (68 weight percent ethylene and 32 weight percent propylene, based on the total weight of the copolymer); BUNA™ EP T2370 (3 weight percent ethylidene norbornene, 72 weight percent ethylene, and 25 weight percent propylene, based on the total weight of the copolymer); BUNA™ EP T2460 (4 weight percent ethylidene norbornene, 62 weight percent ethylene, and 34 weight percent propylene, based on the total weight of the copolymer); ExxonMobil Chemical's VISTALON™ 707 (72 weight percent ethylene and 28 weight percent propylene, based on the total weight of the copolymer); VISTALON™ 722 (72 weight percent ethylene and 28 weight percent propylene, based on the total weight of the copolymer); and VISTALON™ 828 (60 weight percent ethylene and 40 weight percent propylene, based on the total weight of the copolymer).

Suitable ethylene-propylene elastomers also include ExxonMobil Chemical's VISTAMAXX™ elastomers, particularly grades 6100, 1100, and 3000, and The Dow Chemical Company's VERSIFY™ elastomers, particularly grades DP3200.01, DP3300.01, and DP3400.01, which have ethylene contents of 9 weight percent, 12 weight percent, and 15 weight percent, respectively, based upon the total weight of the copolymer.

Additional EPDM rubbers include Dow's NORDEL™ hydrocarbon rubber, e.g., the 3722P, 4760P, and 4770R grades.

Preferably, the tackifier composition is present in an amount from about 1 to about 20 weight percent, relative to the total weight of the polyolefin-based composition. More preferably, the tackifier composition is present in an amount from about 2 to about 10 weight percent, even more preferably, from about 3 to about 7 weight percent.

The tackifier composition is made from and/or contains a hydrocarbon-based tackifier. Examples of suitable hydrocarbon-based tackifiers include aliphatic, cycloaliphatic, and aromatic hydrocarbons, modified hydrocarbons, hydrogenated versions, and mixtures of two or more of these tackifiers. These tackifying resins have a ring and ball softening point from 70 degrees Celsius to 150 degrees Celsius.

Useful examples include EASTOTAC™ H-100, H-115 and H-130 (Eastman Chemical Co.), which are partially hydrogenated cycloaliphatic petroleum hydrocarbon resins with softening points of 100 degrees Celsius, 115 degrees Celsius, and 130 degrees Celsius, respectively. These are available in the E grade, the R grade, the L grade and the W grade, indicating differing levels of hydrogenation.

Other useful tackifying resins include ESCOREZ™5300, 5320, 5340, 5380, 5400, and 5637, partially hydrogenated aliphatic petroleum hydrocarbon resins, and ESCOREZ™5600, 5620, and 5690, partially hydrogenated aromatic modified petroleum hydrocarbon resins all available from ExxonMobil Chemical Co.; WINGTACK™ Extra, which is an aliphatic, aromatic petroleum hydrocarbon resin (Goodyear Chemical Co.); HERCOLITE™ 2100, a partially hydrogenated cycloaliphatic petroleum hydrocarbon resin (Hercules, Inc.).; NORSOLENE™ hydrocarbon resins (Cray Valley); and ARKON™ water white, hydrogenated hydrocarbon resins (Arakawa Europe GmbH).

Preferably, the hydrocarbon-based tackifier is a cyclic-hydrocarbon-based tackifier.

The polyolefin-based composition can include other commonly used components. Suitable examples include adhesion promoters, elastomeric polymers, UV inhibitors, antioxidants, thermal stabilizers, and the like. For some examples of these, see U.S. Pat. No. 6,835,777, the teachings of which are incorporated herein by reference.

In further embodiments, the present disclosure provides an adhesive made from and/or containing a polyolefin-based composition made from and/or containing (a) from about 1 to about 30 weight percent of a grafted polyolefin composition, relative to the total weight of the polyolefin-based composition, (b) from about 10 to about 80 weight percent of a linear low density polyethylene composition, relative to the total weight of the polyolefin-based composition, (c)

from about 10 to about 40 weight percent of an elastomer composition, relative to the total weight of the polyolefin-based composition, (d) from about 1 to about 20 weight percent of a tackifier composition, relative to the total weight of the polyolefin-based composition, and (e) optionally, an additives composition.

The adhesive composition can take any form, e.g., hot-melt, pressure sensitive, solvent-based, etc. Hot-melt adhesive compositions are preferred.

The adhesives are particularly useful as a tie-layer for making multi-layer structures such as films and sheets, including barrier films. Conventionally, a film has a thickness of less than about 10 mils while a sheet has a thickness of as least about 10 mils. The multi-layer structures have at least two layers in addition to the adhesive layer, which bonds the other layers together. Usually, at least one layer serves as a barrier layer.

Tie-layer adhesives of the present disclosure can be used in numerous multi-layer structures, including structures having five, seven, nine, or more layers.

In yet additional embodiments, the present disclosure provides a multi-layered structure made from and/or containing a tie-layer adhesive made from and/or containing a polyolefin-based composition. The polyolefin-based composition is made from and/or contains (a) from about 1 to about 30 weight percent of a grafted polyolefin composition, relative to the total weight of the polyolefin-based composition, (b) from about 10 to about 80 weight percent of a linear low density polyethylene composition, relative to the total weight of the polyolefin-based composition, (c) from about 10 to about 40 weight percent of an elastomer composition, relative to the total weight of the polyolefin-based composition, (d) from about 1 to about 20 weight percent of a tackifier composition, relative to the total weight of the polyolefin-based composition, and (e) optionally, an additives composition.

Preferably, the tie-layer adhesive is adjacent to a layer of polyester. More preferably, the tie-layer adhesive binds the layer of polyester to a dissimilar substrate.

As previously defined, the term "polyester" includes a variety of polymers. Preferably, the polyester is a polyethylene terephthalate or a copolyester.

Examples

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

For the comparative examples and the examples of an embodiment of the present invention, various compounds were formulated to prepare test specimen. Those compounds are recited and grouped below as a grafted polyolefin, a linear low density polyethylene, an elastomer, a tackifier, or an additive. The materials were admixed in the weight percents shown in Tables 1-4.

Grafted Polyolefin: The grafted polyolefin was the reaction product of a high density polyethylene and maleic anhydride, having a melt index of 6 grams per 10 minutes and a maleic anhydride content of 1.6 weight percent, based upon the total weight of the grafted polyolefin.

Linear Low Density Polyethylene: Equistar Chemical's PETROTHENE™ GA503 linear low density polyethylene (Melt Index: 3.5 grams per 10 minutes; Density of 0.925 grams per cubic centimeter); Equistar Chemical's PETROTHENE™ GA616050 linear low density polyethylene (Melt Index: 7.0 grams per 10 minutes; Density of 0.918 grams per cubic centimeter); Equistar Chemical's STAR-FLEX™ GM1210BAX01 metallocene linear low density polyethylene (Melt Index: 1.0 grams per 10 minutes; Density of 0.912 grams per cubic centimeter; Polydispersity Index: 2.74; $M_n$: 43,600; $M_w$: 119,300; $M_z$: 226,300; and $M_{z+1}$: 366,800); Equistar Chemical's STARFLEX™ GM1280EA metallocene linear low density polyethylene (Melt Index: 8.0 grams per 10 minutes; Density of 0.912 grams per cubic centimeter; Polydispersity Index: 2.91; $M_n$: 24,200; $M_w$: 70,600; $M_z$: 135,200; and $M_{z+1}$: 224,900); and Equistar Chemical's STARFLEX™ GM1835CAX01 metallocene linear low density polyethylene (Melt Index: 3.5 grams per 10 minutes; Density of 0.918 grams per cubic centimeter; Polydispersity Index: 2.58; $M_n$: 32,800; $M_w$: 84,700; $M_z$: 160,400; and $M_{z+1}$: 263,000).

Long-Chain Branched Polyolefin: Equistar Chemical's PETROTHENE™ NA940000 extrusion grade low density polyethylene (Melt Index: 0.25 grams per 10 minutes; Density: 0.918 grams per cubic centimeter).

Elastomer: The Dow Chemical Company's ENGAGE™ 8100 ethylene/octene copolymer (Melt Index: 1.0 grams per 10 minutes; Density of 0.870 grams per cubic centimeter); The Dow Chemical Company's ENGAGE™ 8180 ethylene/octene copolymer (Melt Index: 0.50 grams per 10 minutes; Density of 0.863 grams per cubic centimeter); The Dow Chemical Company's ENGAGE™ 8200 ethylene/octene copolymer (Melt Index: 5.0 grams per 10 minutes; Density of 0.870 grams per cubic centimeter); ExxonMobil Company's VISTALON™ 722 ethylene propylene rubber, having 72 weight percent ethylene recurring units, based upon the total weight of the EPR (Melt Index of 1.0 grams per 10 minutes).

Tackifier: Eastman Chemical Company's EASTOTAC™ H-115W hydrogenated hydrocarbon resin (Ring and Ball Softening Point of 115 degrees Celsius; Density: 1.04 grams per cubic centimeter); Eastman Chemical Company's EASTOTAC™ H-130W hydrogenated hydrocarbon resin (Ring and Ball Softening Point of 130 degrees Celsius; Density: 1.04 grams per cubic centimeter); and ExxonMobil Company's ESCOREZ™ 5320 partially hydrogenated aliphatic petroleum hydrocarbon resin (Ring and Ball Softening Point of 122 degrees Celsius; Polydispersity Index: 2.3; $M_w$: 430).

Additives: B225 which is a 1:1 blend of IRGANOX™ 1076 sterically-hindered phenolic antioxidant and IRGAFOS™ 168 trisarylphosphite processing stabilizer.

Comparative Ultra Low Density Polyethylene: The Dow Chemical Company's ATTANE™ 4203 ethylene/octene copolymer (Melt Index: 0.8 grams per 10 minutes; Density: 0.905 grams per cubic centimeter).

Polyester Layer: Eastman Chemical Company's EASTOBOND™ 19411 copolyester, Eastman Chemical Company's GP001™ copolyester, and Invista's POLYCLEAR™ 8801 copolyester.

HDPE Layer: Equistar Chemical's ALATHON™ M6210 high density polyethylene (Melt Index: 0.95 grams per 10 minutes; Density: 0.958 grams per cubic centimeter).

All test specimens were five-layer structures: HDPE/tie layer/PET/tie layer/HDPE. The layer distribution was 43 thickness percent, 4 thickness percent, 6 thickness percent, 4 thickness percent, and 43 thickness percent, respectively based on total structure thickness. Multi-layer structures were (a) 3 mil, (b) 7 mil, or (c) 40 mil thick structures.

Each multi-layer structure was made on a Killion extruder (comprised of 3 extruders in this case) with a barrel length to barrel diameter (L/D) ratio of 24:1, a barrel diameter of about 2.54 cm (1 inch) to about 3.18 cm (1.25 inches), and 3 barrel heating zones. Killion extruders may be obtained from Killion Extruders, Inc. of Cedar Grove, N.J.

| Extruder | Barrel Diameter | XL:D Ratio | Heating Zones |
|---|---|---|---|
| Extruder 1 | 3.18 cm (1.25 inches) | 24:1 | 3 |
| Extruders 2 & 3 | 2.54 cm (1 inch) | 24:1 | 3 |

TABLE 1

| Component/Test** | C. Ex. 1 | C. Ex. 2 | Ex. 3 | Ex. 4 | C. Ex. 5 | Ex. 6 |
|---|---|---|---|---|---|---|
| ULDPE: Attane 4203 | 52.85 | | | | | |
| Grafted Polyolefin | 12 | 12 | 12 | 12 | 12 | 12 |
| Linear Low Density Polyethylene | | | | | | |
| GM1210 | | 57.85 | | 26.425 | 57.85 | |
| GM1280 | | | 57.85 | 26.425 | | 57.85 |
| Elastomer | | | | | | |
| ENGAGE 8100 | 15 | 25 | 25 | 15 | | |
| ENGAGE 8200 | | | | | 25 | 25 |
| VISTALON 722 | 15 | | | 15 | | |
| Tackifier: ESCOREZ 5320 | 5 | 5 | 5 | 5 | 5 | 5 |
| Additive: B225 | 0.15 | 0.15 | 0.15 | 0.15 | 0.15 | 0.15 |
| 3-Mil (w/19411 PET): Adhesion (1 Day) kg/cm (lb/in) | 0.25 (1.4) | 0.214 (1.2) | 0.363 (2.03) | 0.334 (1.87) | 0.232 (1.3) | 0.257 (1.44) |
| 7-Mil (w/19411 PET): Adhesion (1 Day) kg/cm (lb/in) | 0.295 (1.65) | 0.079 (0.44) | 0.520 (2.91) | 0.363 (2.03) | 0.068 (0.38) | 0.486 (2.72) |

**All weight percentages are based upon the total weight of the final composition.

TABLE 2

| Component/Test** | Ex. 7 | Ex. 8 | Ex. 9 |
|---|---|---|---|
| Grafted Polyolefin | 12 | 12 | 12 |
| Linear Low Density Polyethylene | | | |
| GA616 | | 15.85 | |
| GM1210 | 26 | 18.5 | |
| GM1835 | 26.85 | 18.5 | 52.85 |
| Elastomer | | | |
| ENGAGE 8180 | 15 | 15 | 15 |
| VISTALON 722 | | | 15 |
| Tackifier | | | |
| H-130 | 5 | | 5 |
| ESCOREZ 5320 | | 5 | |
| Additive: B225 | 0.15 | 0.15 | 0.15 |
| 40-Mil (w/ GP001 PET): Adhesion (1 Day) kg/cm (lb/in) | 0.332 (1.86) | 0.354 (1.98) | 0.277 (1.55) |
| 40-Mil (w/ GP001 PET): Adhesion (7 Day) kg/cm (lb/in) | 0.325 (1.82) | 0.332 (1.86) | 0.246 (1.38) |
| 40-Mil (w/ 8801 PET): Adhesion (1 Day) kg/cm (lb/in) | 0.445 (2.49) | | 0.242 (1.36) |
| 40-Mil (w/ 8801 PET): Adhesion (7 Day) kg/cm (lb/in) | 0.513 (2.87) | | 0.225 (1.26) |

**All weight percentages are based upon the total weight of the final composition.

TABLE 3

| Component/Test** | Ex. 10 | C. Ex. 11 | Ex. 12 | C. Ex. 13 | C. Ex. 14 | Ex. 15 |
|---|---|---|---|---|---|---|
| Grafted Polyolefin | 12 | 12 | 12 | 12 | 12 | 12 |
| Linear Low Density Polyethylene | | | | | | |
| GA616 | | | | | 17.85 | 15.85 |
| GM1210 | | | 10 | 10 | 20 | 18.5 |
| GM1835 | 52.85 | 57.85 | 42.85 | 47.85 | 20 | 18.5 |
| Elastomer | | | | | | |
| ENGAGE 8180 | 15 | 15 | 15 | 15 | 15 | 15 |
| VISTALON 722 | 15 | 15 | 15 | 15 | 15 | 15 |
| Tackifier: ESCOREZ 5320 | 5 | | 5 | | | 5 |
| Additive: B225 | 0.15 | 0.15 | 0.15 | 0.15 | 0.15 | 0.15 |
| 3-Mil (w/8801 PET): Adhesion (1 Day) kg/cm (lb/in) | 0.218 (1.22) | 0.130 (0.73) | 0.375 (2.1) | 0.164 (0.92) | 0.120 (0.67) | 0.327 (1.83) |

**All weight percentages are based upon the total weight of the final composition.

TABLE 4

| Component/Test** | Ex. 16 | C. Ex. 17 | Ex. 18 | Ex. 19 |
|---|---|---|---|---|
| Grafted Polyolefin | 12 | 12 | 12 | 12 |
| Linear Low Density Polyethylene | | | | |
| GA503 | | | 52.85 | |
| GM1210 | | 21 | | |
| GM1835 | 21.85 | | 47.85 | 42.85 |
| Long-Chain Branched Polyolefin | | | | |
| NA940 | 10 | | 5 | 10 |
| Elastomer | | | | |
| ENGAGE 8180 | 15 | 15 | 15 | 15 |
| VISTALON 722 | 15 | 15 | 15 | 15 |
| Tackifier | | | | |
| H-115 | 5 | | | |
| H-130 | | 5 | 5 | 5 |
| Additive: B225 | 0.15 | 0.15 | 0.15 | 0.15 |
| 40-Mil (w/GP001 PET): | 0.336 | 0.107 | 0.211 | 0.175 |
| Adhesion (1 Day) kg/cm (lb/in) | (1.88) | (0.60) | (1.18) | (0.98) |
| 40-Mil (w/GP001 PET): | 0.296 | 0.077 | 0.202 | 0.161 |
| Adhesion (7 Day) kg/cm (lb/in) | (1.66) | (0.43) | (1.13) | (0.90) |
| 40-Mil (w/8801 PET): | 0.482 | 0.130 | 0.304 | 0.234 |
| Adhesion (1 Day) kg/cm (1b/in) | (2.70) | (0.73) | (1.70) | (1.31) |
| 40-Mil (w/8801 PET): | 0.550 | 0.279 | 0.255 | 0.205 |
| Adhesion (7 Day) kg/cm (lb/in) | (3.08) | (1.56) | (1.43) | (1.15) |

**All weight percentages are based upon the total weight of the final composition.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A polyolefin-based composition comprising:
    (a) a grafted polyolefin composition comprising a polyolefin grafted with an unsaturated monomer;
    (b) a linear low density polyethylene composition comprising a first metallocene-catalyzed linear low density polyethylene having a melt index from about 2 to about 10 grams per 10 minutes, a density from about 0.910 to about 0.925 grams per cubic centimeter, and a polydispersity index from about 2 to about 4;
    (c) an elastomer composition comprising a polyethylene elastomer;
    (d) a tackifier composition comprising a hydrocarbon-based tackifier; and
    (e) optionally, one or more additives.

2. The polyolefin-based composition of claim 1 wherein the polyolefin grafted with an unsaturated monomer is a high-density polyethylene (HDPE) grafted with maleic anhydride.

3. The polyolefin-based composition of claim 1 wherein the linear low density polyethylene composition further comprises a second metallocene-catalyzed linear low density polyethylene having a melt index from about 0.5 to about 2 grams per 10 minutes, a density from about 0.910 to about 0.925 grams per cubic centimeter, and a polydispersity index from about 2 to about 4.

4. The polyolefin-based composition of claim 3 wherein the linear low density polyethylene composition further comprises a third linear low density polyethylene having a melt index from about 5 to about 10 grams per 10 minutes and a density from about 0.910 to about 0.925 grams per cubic centimeter.

5. The polyolefin-based composition of claim 1 further comprises a long-chain branched polyolefin having a melt index from about 0.1 to about 25.0 grams per 10 minutes.

6. The polyolefin-based composition of claim 1 wherein the polyethylene elastomer is polyethylene copolymer comprising
    (a) ethylene-derived units and
    (b) alpha-olefin comonomer units derived from at least one comonomer selected from the group consisting of $C_3$ to $C_{10}$ alpha-olefins.

7. The polyolefin-based composition of claim 6 wherein the polyethylene copolymer is an ethylene/octene copolymer having a melt index from about 0.2 to about 6.0 grams per 10 minutes and a density from about 0.850 to about 0.900 grams per cubic centimeter.

8. The polyolefin-based composition of claim 6 wherein the polyolefin elastomer further comprises ethylene-propylene elastomer selected from the group consisting of an ethylene-propylene rubber (EPR) or an ethylene-propylene-diene monomer rubber (EPDM).

9. The polyolefin-based composition of claim 8 wherein the ethylene-propylene elastomer is an ethylene-propylene rubber (EPR) having
    (a) a melt index from about 0.2 to about 5.0 grams per 10 minutes and
    (b) a total content of ethylene-derived units in an amount from about 55 to about 85 weight percent, based upon the total weight of the ethylene propylene rubber.

10. The polyolefin-based composition of claim 1 wherein the hydrocarbon-based tackifier is a cyclic-hydrocarbon-based tackifier.

11. The polyolefin-based composition of claim 1 comprising:
    (a) from about 1 to about 30 weight percent of the grafted polyolefin composition, relative to the total weight of the polyolefin-based composition;
    (b) from about 10 to about 80 weight percent of the linear low density polyethylene composition, relative to the total weight of the polyolefin-based composition;
    (c) from about 10 to about 40 weight percent of the elastomer composition, relative to the total weight of the polyolefin-based composition;
    (d) from about 1 to about 20 weight percent of the tackifier composition, relative to the total weight of the polyolefin-based composition; and
    (e) optionally, from about 0.01 to about 5 weight percent of one or more additives, relative to the total weight of the polyolefin-based composition.

12. The polyolefin-based composition of claim 1 comprising:
    (a) from about 1 to about 30 weight percent of the grafted polyolefin composition, relative to the total weight of the polyolefin-based composition;

(b) from about 10 to about 80 weight percent of the linear low density polyethylene composition, relative to the total weight of the polyolefin-based composition, comprising
  (i) from about 10 to about 100 weight percent of the first metallocene-catalyzed linear low density polyethylene having a melt index from about 2 to about 10 grams per 10 minutes, a density from about 0.910 to about 0.925 grams per cubic centimeter, and a polydispersity index from about 2 to about 4, relative to the total weight of the linear low density polyethylene composition,
  (ii) from 0 to about 50 weight percent of a second metallocene-catalyzed linear low density polyethylene having a melt index from about 0.5 to about 2 grams per 10 minutes, a density from about 0.910 to about 0.925 grams per cubic centimeter, and a polydispersity index from about 2 to about 4, relative to the total weight of the linear low density polyethylene composition, and
  (iii) from 0 to about 50 weight percent of a third linear low density polyethylene having a melt index from about 5 to about 10 grams per 10 minutes and a density from about 0.910 to about 0.925 grams per cubic centimeter, relative to the total weight of the linear low density polyethylene composition;
(c) from about 10 to about 40 weight percent of the elastomer composition, relative to the total weight of the polyolefin-based composition;
(d) from about 1 to about 20 weight percent of the tackifier composition, relative to the total weight of the polyolefin-based composition; and
(e) optionally, from about 0.01 to about 5 weight percent of one or more additives, relative to the total weight of the polyolefin-based composition.

13. The polyolefin-based composition of claim 1 comprising:
(a) from about 1 to about 30 weight percent of the grafted polyolefin composition, relative to the total weight of the polyolefin-based composition;
(b) from about 10 to about 80 weight percent of the linear low density polyethylene composition, relative to the total weight of the polyolefin-based composition, comprising
  (i) from about 10 to about 100 weight percent of the first metallocene-catalyzed linear low density polyethylene having a melt index from about 2 to about 10 grams per 10 minutes, a density from about 0.910 to about 0.925 grams per cubic centimeter, and a polydispersity index from about 2 to about 4, relative to the total weight of the linear low density polyethylene composition,
  (ii) from 0 to about 50 weight percent of a second metallocene-catalyzed linear low density polyethylene having a melt index from about 0.5 to about 2 grams per 10 minutes, a density from about 0.910 to about 0.925 grams per cubic centimeter, and a polydispersity index from about 2 to about 4, relative to the total weight of the linear low density polyethylene composition, and
  (iii) from 0 to about 50 weight percent of a long-chain branched polyolefin having a melt index from about 0.1 to about 25 grams per 10 minutes, relative to the total weight of the linear low density polyethylene composition;
(c) from about 10 to about 40 weight percent of the elastomer composition, relative to the total weight of the polyolefin-based composition;
(d) from about 1 to about 20 weight percent of the tackifier composition, relative to the total weight of the polyolefin-based composition; and
(e) optionally, from about 0.01 to about 5 weight percent of one or more additives, relative to the total weight of the polyolefin-based composition.

14. An adhesive comprising a polyolefin-based composition comprising:
(a) from about 1 to about 30 weight percent of a grafted polyolefin composition, relative to the total weight of the polyolefin-based composition, comprising a polyolefin grafted with an unsaturated monomer;
(b) from about 10 to about 80 weight percent of a linear low density polyethylene composition, relative to the total weight of the polyolefin-based composition, comprising a metallocene-catalyzed linear low density polyethylene having a melt index from about 2 to about 10 grams per 10 minutes, a density from about 0.910 to about 0.925 grams per cubic centimeter, and a polydispersity index from about 2 to about 4;
(c) from about 10 to about 40 weight percent of an elastomer composition, relative to the total weight of the polyolefin-based composition, comprising a polyethylene elastomer;
(d) from about 1 to about 20 weight percent of a tackifier composition, relative to the total weight of the polyolefin-based composition, comprising a hydrocarbon-based tackifier; and
(e) optionally, one or more additives.

15. A multi-layered structure comprising a tie-layer adhesive comprising a polyolefin-based composition comprising:
(a) from about 1 to about 30 weight percent of a grafted polyolefin composition, relative to the total weight of the polyolefin-based composition, comprising a polyolefin grafted with an unsaturated monomer;
(b) from about 10 to about 80 weight percent of a linear low density polyethylene composition, relative to the total weight of the polyolefin-based composition, comprising a metallocene-catalyzed linear low density polyethylene having a melt index from about 2 to about 10 grams per 10 minutes, a density from about 0.910 to about 0.925 grams per cubic centimeter, and a polydispersity index from about 2 to about 4;
(c) from about 10 to about 40 weight percent of an elastomer composition, relative to the total weight of the polyolefin-based composition, comprising a polyethylene elastomer;
(d) from about 1 to about 20 weight percent of a tackifier composition, relative to the total weight of the polyolefin-based composition, comprising a hydrocarbon-based tackifier; and
(e) optionally, one or more additives.

16. The multi-layered structure of claim 15 comprising a layer of polyester.

17. The multi-layer structure of claim 16 wherein the polyester is a polyethylene terephthalate.

18. The multi-layer structure of claim 16 wherein the polyester is a copolyester.

* * * * *